United States Patent [19]

Hockey

[11] Patent Number: 5,651,506

[45] Date of Patent: Jul. 29, 1997

[54] MULTI-COMPARTMENT CONDIMENT GRINDER

[75] Inventor: Thomas W. J. Hockey, Simi Valley, Calif.

[73] Assignee: Leeds Engineering Corporation, Camarillo, Calif.

[21] Appl. No.: 688,246

[22] Filed: Jul. 29, 1996

[51] Int. Cl.$^6$ .............................. A47J 42/00; A47G 19/24
[52] U.S. Cl. .................. 241/169.1; 241/168; 241/273.2; 222/142.1
[58] Field of Search ............... 241/169.1, 168, 241/273.2; 222/142.1, 142.2, 142.4, 142.6, 142.7

[56] References Cited

U.S. PATENT DOCUMENTS

| | | | |
|---|---|---|---|
| 1,279,235 | 9/1918 | Bontya | 222/142.1 |
| 2,535,913 | 12/1950 | Galvin et al. | 222/142.6 |
| 2,661,871 | 12/1953 | Huenergardt | 222/142.1 X |
| 4,530,470 | 7/1985 | Beilstein | 241/169.1 |
| 4,632,322 | 12/1986 | Beilstein | 241/169.1 |
| 4,685,627 | 8/1987 | Lee | 241/169.1 |
| 4,815,671 | 3/1989 | Akira | 241/169.1 |
| 4,844,352 | 7/1989 | Griffin | 241/101.2 |
| 4,925,150 | 5/1990 | Tedioli | 241/169.1 |
| 4,993,584 | 2/1991 | Macario | 222/142.1 X |
| 5,145,119 | 9/1992 | Lowe | 241/101.2 |

FOREIGN PATENT DOCUMENTS

| | | | |
|---|---|---|---|
| 610332 | 12/1960 | Canada | 222/142.1 |
| 3430196 | 12/1985 | Germany | 241/169.1 |

*Primary Examiner*—John M. Husar
*Assistant Examiner*—Julie A. Krolikowski
*Attorney, Agent, or Firm*—Jack C Munro

[57] ABSTRACT

A multi-compartment condiment grinder which comprises a cylindrical enclosing housing, preferably transparent, which is divided into a plurality of separate compartments. Each compartment is designed to be filled with a type of condiment with there normally being different types of condiments located within each compartment. The bottom end of the enclosing housing is mounted on a sleeve assembly with this sleeve assembly being pivotable. The sleeve assembly includes a center section which is basically closed except for a hole. The center section is to be mounted against the bottom end of the enclosing housing. Pivoting of the sleeve assembly will move the hole to align with a single dispensing opening of a compartment with the hole being capable of being aligned with each dispensing opening. The condiment flows through the hole into a grinding chamber with a grinder mechanism being mounted in conjunction with the grinding chamber. The grinding mechanism is to be utilized when it is at a lower elevation than the sleeve assembly. At this lower elevation, pivotal movement of the sleeve assembly is not possible. Inverting of the housing will locate the grinding mechanism at a higher elevation than the sleeve assembly which will then permit the pivoting movement of the sleeve assembly relative to the housing locating of the hole in alignment with the dispensing opening of a different compartment.

8 Claims, 2 Drawing Sheets

MULTI-COMPARTMENT CONDIMENT GRINDER

BACKGROUND OF THE INVENTION

1) FIELD OF THE INVENTION

This invention relates to a condiment grinder of the kind having a container to hold the condiment in granule or pellet form to be ground into small particles, with the grinder comprising a pair of a cooperating coaxial grinding tools at the base of the container, one tool being rotatable relative to the other.

2) DESCRIPTION OF THE PRIOR ART

Condiment grinders are widely known at the present time. The basic structure of a condiment grinder comprises a housing and has an internal chamber. Within the internal chamber is to be placed a quantity of the condiment in pellet or granule form that is to be ground into small particles. The bottom end of the chamber includes a grinder. The user is to hold fast the housing and then cause rotation of the grinder which will result in grinding of some portion of the condiment. The produced small particles are then dispensed exteriorly of the grinder.

It's not at all uncommon to have certain members of a family, or within any single group of people that are sitting at a table for the purpose of eating, to desire different types of ground condiments. For example, one particular individual may want a black pepper while another individual may desire another type of pepper such as garlic pepper, lemon pepper, green peppercorns and so forth. Ground pepper of different types could be placed on the table and made available to the different individuals.

It is known that if the peppers are ground right at the table, their taste is far superior to peppers that have been pre-ground. Therefore, in the past in order to make available different types of fresh peppers that are to be ground at the table, it was necessary to provide at least two pepper grinders. To overcome the disadvantage of providing several pepper grinders at a single table or restaurant, there has been constructed a condiment dispenser which can be used to dispense a plurality of different condiments. It is common to incorporate a salt dispenser in conjunction with a pepper grinder. It has also been known to incorporate a multitude of different grinders into a single housing with each grinder to be utilized to grind a single condiment.

In the past, it has not been known to be feasible to utilize a single grinder in conjunction with a multitude of different condiments. The reason for this is that when a particular condiment is ground, and then the grinder moved to grind a second condiment, inherently there will remain a small amount of the first condiment. This means that the individual that is desirous of a certain type of condiment is actually getting a small part of another type of condiment. For this reason, it has been believed to not be feasible to utilize a single grinder with a plurality of different condiments.

SUMMARY OF THE INVENTION

The structure of the present invention is directed to a multi-compartment condiment grinder where each compartment is to be filled with a different type of condiment such as the peppercorns of different types of peppers. Each compartment is capable of feeding into a single grinding chamber. Separating the grinding chamber from the compartments is a center section with this center section having a hole that is to connect with only one of the compartments. The condiment from that connected compartment is to pass through the hole into the grinding chamber and then is to be ground by manual operation of a grinding mechanism and dispensing of the ground condiment into the ambient. If it is desired to change and grind a condiment from a different compartment, the condiment grinder is turned upside down which will cause the condiment contained within the grinding chamber to be redeposited back within the compartment. A ring is then pivoted which will move the hole to a different position and be in alignment with another compartment. Then when the condiment grinder is turned right-side-up, the condiment contained within that other compartment is made available to the grinder. Upon operation of mechanism, that particular condiment is to be ground and then dispensed. A detent mechanism is associated with the ring which moves the hole in the center section to be aligned with the different compartments. The detent mechanism will inform the user when the hole is properly aligned with a compartment. When the condiment grinder is located right-side-up, the ring is locked in place and not capable of being pivoted therefore preventing intermixing of the condiments from the different compartments. The ring can only be pivoted on the housing when the condiment grinder is located in the upside down position.

The primary objective of the present invention is to incorporate within a single condiment grinder the ability to grind a multitude of different condiments.

Another objective of the present invention is to construct a condiment grinder which is convenient to use and provides to the user a selection of condiments that are available to be ground.

Another objective of the present invention is to construct a multi-compartment condiment grinder which can be manufactured at a reasonable cost and thereby sold to the consumer at a reasonable cost.

DETAILED DESCRIPTION OF THE PREFERRED EMBODIMENT

Figure 1:
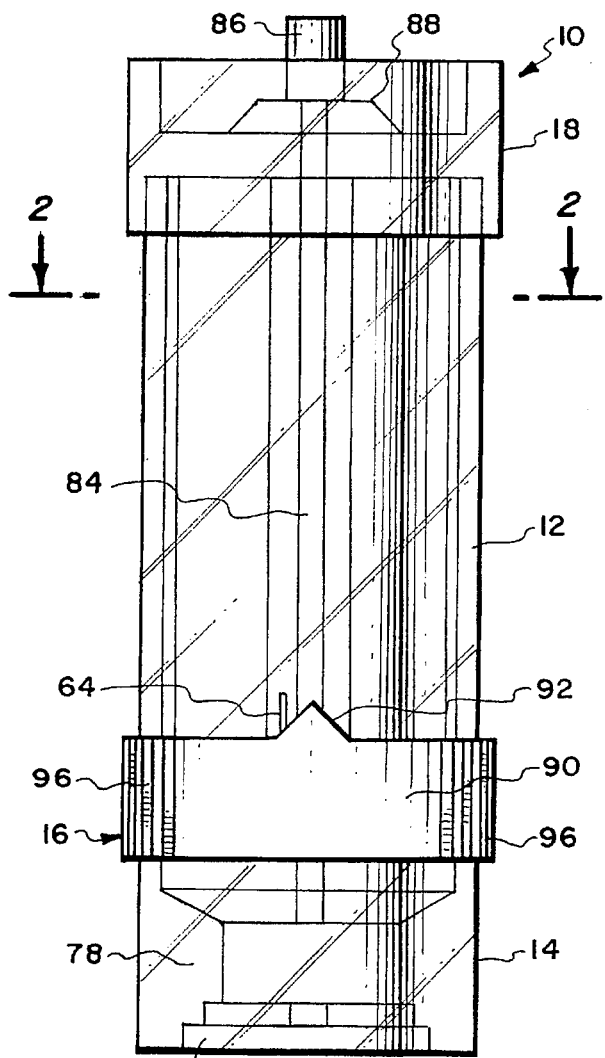
FIG. 1 is a side elevational view of the exterior surface of the multi-compartment condiment grinder of the present invention.
Figure 2:
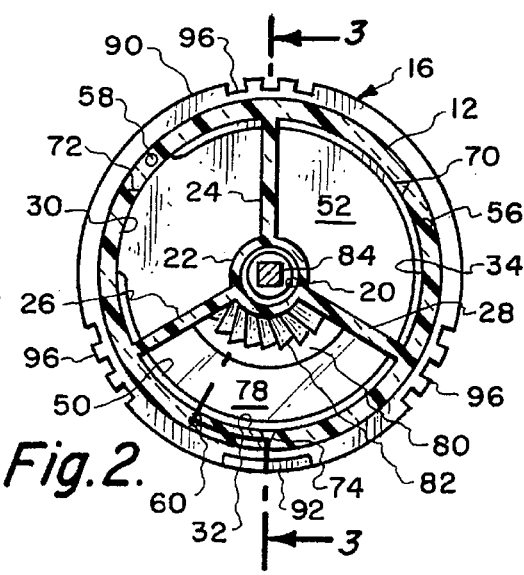
FIG. 2 is a transverse cross-sectional view through the condiment grinder of the present invention taken along line 2—2 of FIG. 1.
Figure 4:
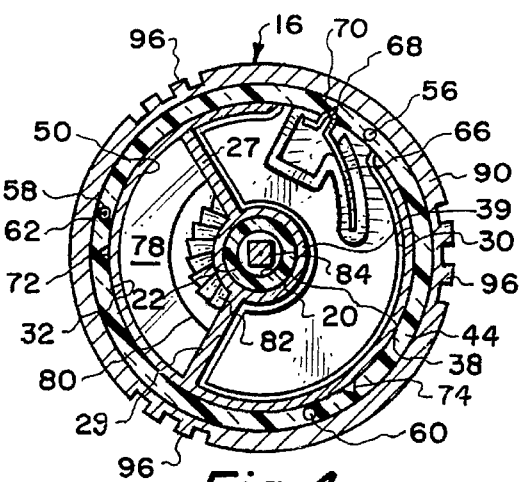
FIG. 4 is a transverse cross-sectional view through the sleeve section included within the condiment grinder of the present invention taken along line 4—4 of FIG. 3 clearly depicting the detent mechanism that is utilized to position the ring in a correct location so that the grinding chamber will receive contents from a single compartment.
Figure 8:
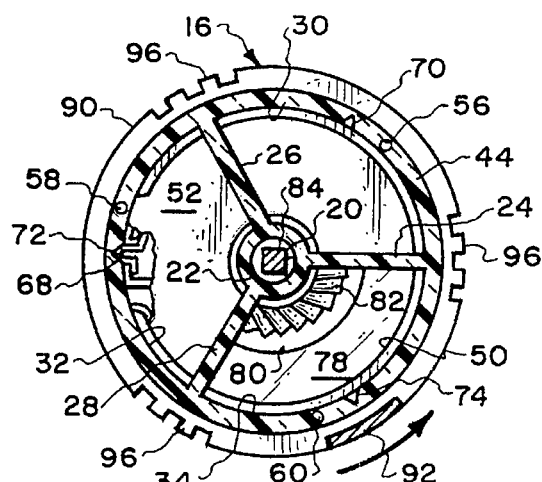
FIG. 8 is a cross-sectional view similar to FIG. 7 showing the grinding mechanism connecting with a second compartment of the multi-compartment housing of the condiment grinder of the invention.
Figure 9:
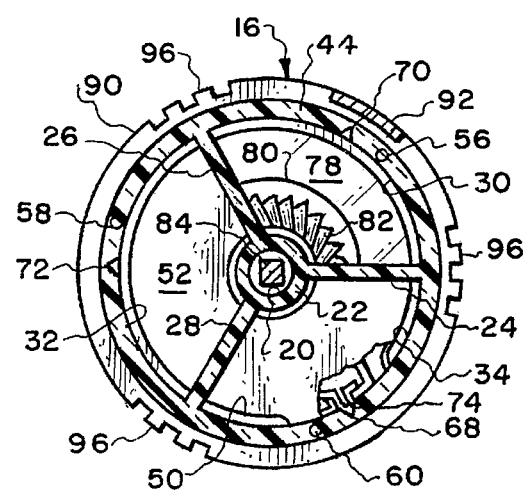
FIG. 9 is a cross-sectional view similar to FIG. 8 showing the grinding mechanism connecting with a third compartment of the enclosing housing of the multi-compartment condiment grinder of this invention.

Referring particularly to the drawing, there is shown a multi-compartment condiment grinder 10 of this invention. The grinder 10 is generally constructed of an enclosed housing 12, a grinding chamber housing 14, a sleeve assembly 16 and a lid 18. Typical material for construction for the enclosed housing 12, grinding chamber 14 and lid 18 would be a transparent plastic such as acrylic. The sleeve assembly 16 will also normally be constructed of plastic which is generally opaque. Closed housing 12 is cylindrical in shape as is also the grinding chamber 14 and lid 18. The sleeve assembly 16, in exterior appearance, is also cylindrical. The exterior diameter of the enclosed housing 12 is generally equal to the exterior diameter of the grinding chamber housing 14. The exterior diameter of the lid 18 is slightly larger than the diameter of the enclosed housing 12. The exterior diameter of the sleeve assembly 16 is also slightly larger than the diameter of the enclosed housing 12.

The enclosed housing 12 has a longitudinal through opening 20. The opening 20 is formed within a tube 22. The tube 22 is centrally disposed within the enclosed housing 12. Integrally connected with the tube 22 and extending therefrom are wall members 24, 26 and 28. The exterior edge of the wall members 24, 26 and 28 are integral with the enclosed housing 12. The wall members 24, 26 and 28 are equiangularly spaced apart which means that the wall members 24, 26 and 28 are approximately one hundred and twenty degrees apart. In between wall members 24 and 26 is formed a compartment 30. There is a similar compartment 32 formed between wall members 26 and 28. There is a third compartment 34 that is located between the wall members 24 and 28. The size of the compartments 30, 32 and 34 are all identical. Each of the compartments 30, 32 and 34 are open at each end.

The sleeve assembly 16 includes a center section 36. Formed within the center section 36 is a center hole 38. A portion of the tube 22 extends beyond the wall members 24, 26 and 28, and it is this portion of the tube 22 that is located within the center hole 38 formed by the tube 39. Tube 39 is integral with radially extending wall members 27 and 29. The center section 36 is longitudinally fixed in position on the tube 22 by means of snap ring 40.

The center section 36 includes an annular groove 42 within which the bottom end 44 of the housing 12 is mounted. Relative pivoting movement between the sleeve assembly 16 and the bottom end 44 of the enclosed housing 12 is permitted. The lid 14 includes an upper end 46 which is mounted within annular groove 48 formed within the center section 36. The upper end 46 merely rests within the annular groove 48. When the sleeve assembly 16 is held against turning along with the enclosed housing 12, the rotatable block 82 is rotated relative to stator block 80 by turning of lid 18 which turns rod 84.

The center section 36 includes a hole 50. The size of the hole 50 is slightly smaller and the same shape as the dispensing opening of each compartment 30, 32 and 34. The dispensing opening is the portion of each compartment 30, 32 and 34 that is located directly adjacent the center section 36. Therefore, when the hole 50 aligns with a dispensing opening of a compartment 30, 32 or 34, the hole 50 will only permit the contents of the aligned compartment 30, 32 or 34 to pass through the hole 50. The contents of the other compartments that are not aligned are prevented from being conducted from their respective compartment by means of a cover plate 52 which is mounted on the center section 36.

Figure 3:
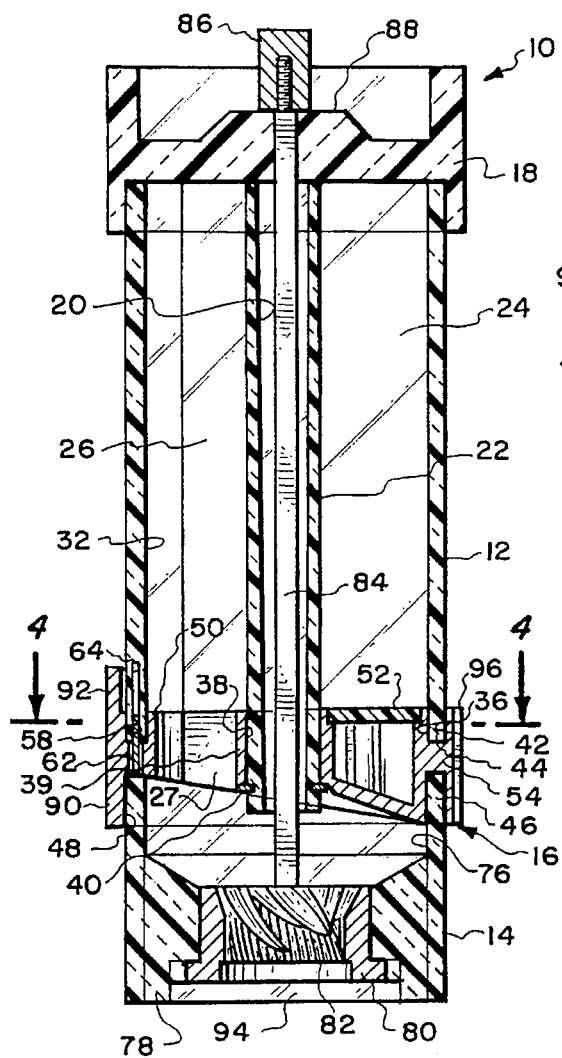
FIG. 3 is a longitudinal cross-sectional view of the condiment grinder of the present invention taken along line 3—3 of FIG. 2 showing the condiment grinder in its normal usage position of grinding and dispensing of a ground condiment where the ring of the sleeve section is locked into position with a locking device.
Figure 5:
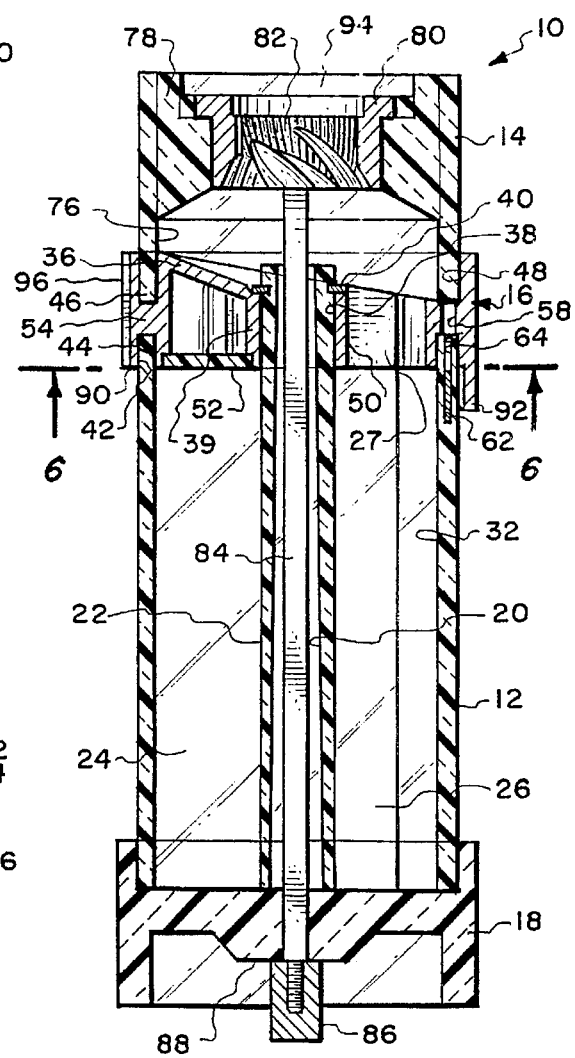
FIG. 5 is a longitudinal cross-sectional view similar to FIG. 3 but showing the condiment grinder in an inverted (upside down) position with the locking means associated with the sleeve assembly now being positioned in the unlocked position thereby permitting pivoting of the sleeve assembly and its ring.
Figure 6:
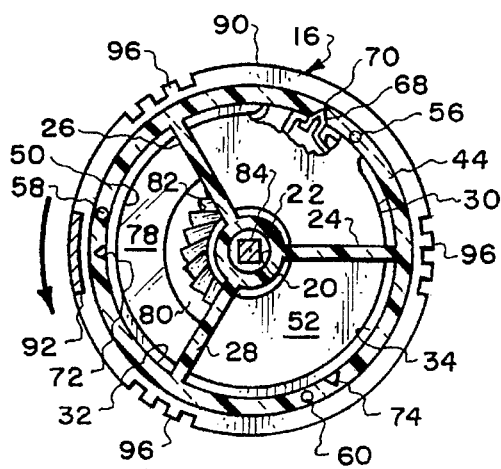
FIG. 6 is a transverse cross-sectional view taken along line 6—6 of FIG. 5 with the sleeve assembly in the same position as it is in FIG. 4 showing the center section of the sleeve assembly connecting with one of the three compartments contained within the condiment grinder of this invention.
Figure 7:
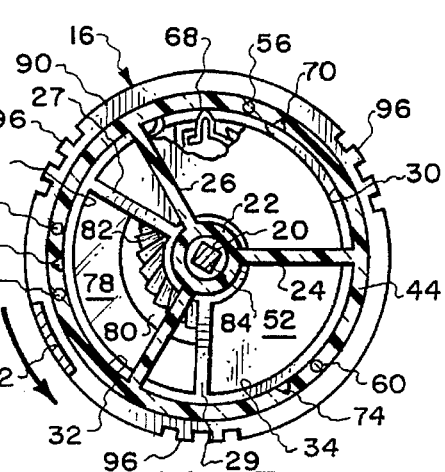
FIG. 7 is a cross-sectional view similar to FIG. 6 but showing the sleeve assembly in the process of being pivoted from one detent position to another detent position.

The portion of the center section 36 that is located in between the bottom end 44 and the upper end 46 is called the annular ridge 54. Formed within the annular ridge 54 are three in number of spaced apart holes 56, 58 and 60. The holes 56, 58 and 60 are equiangularly spaced apart. Mounted within the bottom end 44 is a pin 62. The pin 62 rides within a hole 64 formed within the bottom end 44 of the housing 12. The pin 62 is entirely free to move within the hole 64 and actually when the hole 64 is aligned with any one of holes 56, 58 and 60, a portion of the pin 62 will fall and occupy the hole 56, 58 or 60. The reason for the pin 62 is that when the grinder 10 is in the position shown in FIGS. 1 and 3 of the drawing, the pin 62 is to be located within one of the holes 56, 58 or 60. This will prevent the sleeve assembly 16 which includes ring 90 from pivoting. However, upon the grinder 10 being inverted (as shown in FIG. 5), gravity will cause the pin 62 to move deeper within the hole 64 and become disengaged from the hole with which it is aligned, such as hole 56, 58 or 60. This will then permit sleeve assembly 16 and ring 90 to be pivoted relative to the enclosed housing 12. In other words pin 62 functions as a locking device to lock together the sleeve assembly 16 with the enclosed housing 12.

The center section 36 has mounted therein a leaf spring 66. The leaf spring 66 includes a protrusion 68. This protrusion 68 is capable of engaging with any of the recesses 70, 72 and 74. The recesses 70, 72 and 74 are equiangularly spaced apart and are formed within the interior wall of the bottom end 14 of the housing 12. The sleeve assembly 16 when being pivoted relative to the housing 12 will cause the protrusion 68 to ride along the inside surface of the bottom end 44. When the protrusion 68 comes into contact with one of the recesses 70, 72 and 74, it will snap into the appropriate recess. By applying of a slight manual force, the sleeve assembly 16 and ring 90 can again be pivoted relative to the housing 12 which will cause the protrusion 68 to be moved out of the appropriate recess. In essence the recesses 70, 72 and 74 in conjunction with the protrusion 68 form a detent mechanism. The recesses 70, 72 and 74 are located in such a manner that when the protrusion 68 engages with a recess 70, 72 or 74, the hole 50 aligns with one of the compartments 30, 32 and 34. Therefore, this will indicate to the user that when the snapping action occurs which is caused by the leaf spring 66 of the protrusion 68 engaging with a recess 70, 72 or 74, correct alignment with a compartment 30, 32 or 34 has been obtained.

Formed within the grinder chamber housing 14 is a grinding chamber 76. Connecting with the grinding chamber 76 is a block 78. The block 78 is fixedly mounted within the grinder chamber housing 14. Centrally mounted with the interior of the block 78 is a stator blade 80. Centrally mounted within the stator blade 80 is a rotatable blade 82. The rotatable blade 82 is fixedly mounted to a rod 84 which extends through the longitudinal through opening 20. The outer end of the rod 84 is threadably secured to a knob 86. The knob 86 rests on ledge 88 of the lid 18.

The ring 90 includes a protrusion which forms an arrow 92. The arrow 92 is to function as an alignment device to be visually observed by the user. The user is to align the arrow 92 with the particular compartment 30, 32 or 34 from which the user wishes to extract condiment. With the grinder 10 in the position shown in FIGS. 1 and 3, the condiment within the compartment 26 is conductible through the hole 50 into the grinding chamber 76 and hence in contact with the blades 80 and 82. Pivoting of the lid 18 will cause the stator blade 80 to pivot within the rotatable blade 82 with some of the condiment (not shown) from chamber 26 being captured between the blades 80 and 82 and being then ground and then discharged into the ambient 94.

If the user wishes to now dispense another condiment, such as within compartments 32 or 34, the user then inverts the grinder 10 to the position shown in FIG. 5. This will cause the pin 62 to be removed from hole 58 which will then permit the ring 90 to be grasped and pivoted relative to the housing 12. This pivoting is to occur until the protrusion 68 again engages with a recess such as recess 72. The user will actually align the arrow 92 with the particular compartment 30, 32 or 34 that contains the desired condiment that he or she wishes to dispense. The user then reinverts the grinder 10 which will then cause some of the condiment within the particular compartment 32 or 34 to be conducted through the hole 50 in connection with the blades 80 and 82 and upon manual turning of the lid 18, grinding of the condiment in contact with the blades 80 and 82 will then occur.

To facilitate the non-slip turning motion of the ring 90, the exterior surface of the ring 90 includes three spaced apart sets of longitudinal grooves 96. The grooves 96 are also there for ornamental purposes. When it is desired to fill the compartments 30, 32 and 34 with the appropriate condiments, the knob 86 is to be unthreaded from the rod 84 and the lid 18 is removed, exposing the upper end of compartments 30, 32 and 34. The compartments 30, 32 and 34 are then filled with the appropriate condiments.

What is claimed is:

1. A multi-compartment condiment grinder comprising:

an enclosing housing divided into a plurality of separate compartments, said enclosing housing having a bottom end, each said compartment having a separate dispensing opening, each said compartment to contain a quantity of a condiment;

a sleeve assembly mounted on said housing at said bottom end, said sleeve assembly having a center section located across said bottom end of said housing, said center section having a hole, the size of said hole being no greater than the size of a said dispensing opening;

a grinding chamber located directly adjacent said center section, said hole providing access between a said compartment and said grinding chamber, said sleeve assembly being pivotable on said enclosing housing so as to move said hole between said dispensing openings; and a grinder housing mounted on said sleeve assembly, said grinder housing including a grinding mechanism, said grinding mechanism to receive condiment from said grinding chamber, operation of said grinding mechanism causes grinding of a portion of said condiment and dispensing of such into the ambient, said grinding mechanism to be normally operated only when said grinding mechanism is at a lower elevation than said sleeve assembly.

2. The multi-compartment condiment grinder as defined in claim 1 wherein:

said compartments are the same size.

3. The multi-compartment condiment grinder as defined in claim 2 wherein:

said dispensing openings are the same size.

4. The multi-compartment condiment grinder as defined in claim 1 further comprising:

a detent mechanism connected between said sleeve assembly and said enclosing housing, said detent mechanism functioning to properly position said hole with a said dispensing opening.

5. The multi-compartment condiment grinder as defined in claim 1 wherein:

a locking mechanism connected between said sleeve assembly and said enclosing housing, said locking mechanism being movable between a locking position and an unlocking position, when said locking mechanism is in said locking position said locking mechanism preventing pivotable movement of said sleeve assembly which is when said grinder is at said lower elevation.

6. The multi-compartment condiment grinder as defined in claim 5 wherein:

said unlocking position being when said grinder mechanism is located at a elevation higher than said sleeve assembly which permits pivotal movement of said sleeve assembly.

7. The multi-compartment condiment grinder as defined in claim 1 wherein:

said sleeve assembly having a ring, said ring being located exteriorly of said enclosing housing, said ring having an alignment means, said alignment means to visually align with the said compartment from which a condiment is to be extracted.

8. The multi-compartment condiment grinder as defined in claim 7 wherein:

said alignment means comprising an arrow configuration.

* * * * *